United States Patent

Furutsu

[11] Patent Number: 5,130,732
[45] Date of Patent: Jul. 14, 1992

[54] CAMERA SYSTEM WITH AUTO-FOCUSING DEVICE

[75] Inventor: Etsuro Furutsu, Kawasaki, Japan

[73] Assignee: Canon Kabushiki Kaisha, Tokyo, Japan

[21] Appl. No.: 559,081

[22] Filed: Jul. 30, 1990

[30] Foreign Application Priority Data

Aug. 4, 1989 [JP] Japan .................... 1-203067

[51] Int. Cl.⁵ .................... G03B 17/00; G03B 13/36
[52] U.S. Cl. .................... 354/286; 354/400
[58] Field of Search .................... 354/400, 195.1, 295, 354/286

[56] References Cited

U.S. PATENT DOCUMENTS

| | | |
|---|---|---|
| 4,671,640 | 6/1987 | Akada et al. |
| 4,728,980 | 3/1988 | Nakamura et al. |
| 4,786,932 | 11/1988 | Akashi .................... 354/402 |
| 4,881,094 | 11/1989 | Terui et al. .................... 354/286 |
| 5,053,799 | 10/1991 | Akashi .................... 354/402 |

FOREIGN PATENT DOCUMENTS 63-304233 12/1988 Japan.
1-102412 4/1989 Japan.
2-118538 5/1990 Japan.

*Primary Examiner*—Russell E. Adams
*Attorney, Agent, or Firm*—Fitzpatrick, Cella, Harper & Scinto

[57] ABSTRACT

The present invention relates to a camera system having an auto-focusing device which carries out a so-called overlapped operation in which storing of a light signal by a focus sensor and calculation of a lens drive distance based on the stored value are performed while a lens is driven.

In the present invention, where a lens system mounted on the camera does not have a characteristic suitable to the overlapped operation, it is automatically detected and the overlapped operation is inhibited to prevent improper proceeding of the overlapped operation.

16 Claims, 3 Drawing Sheets

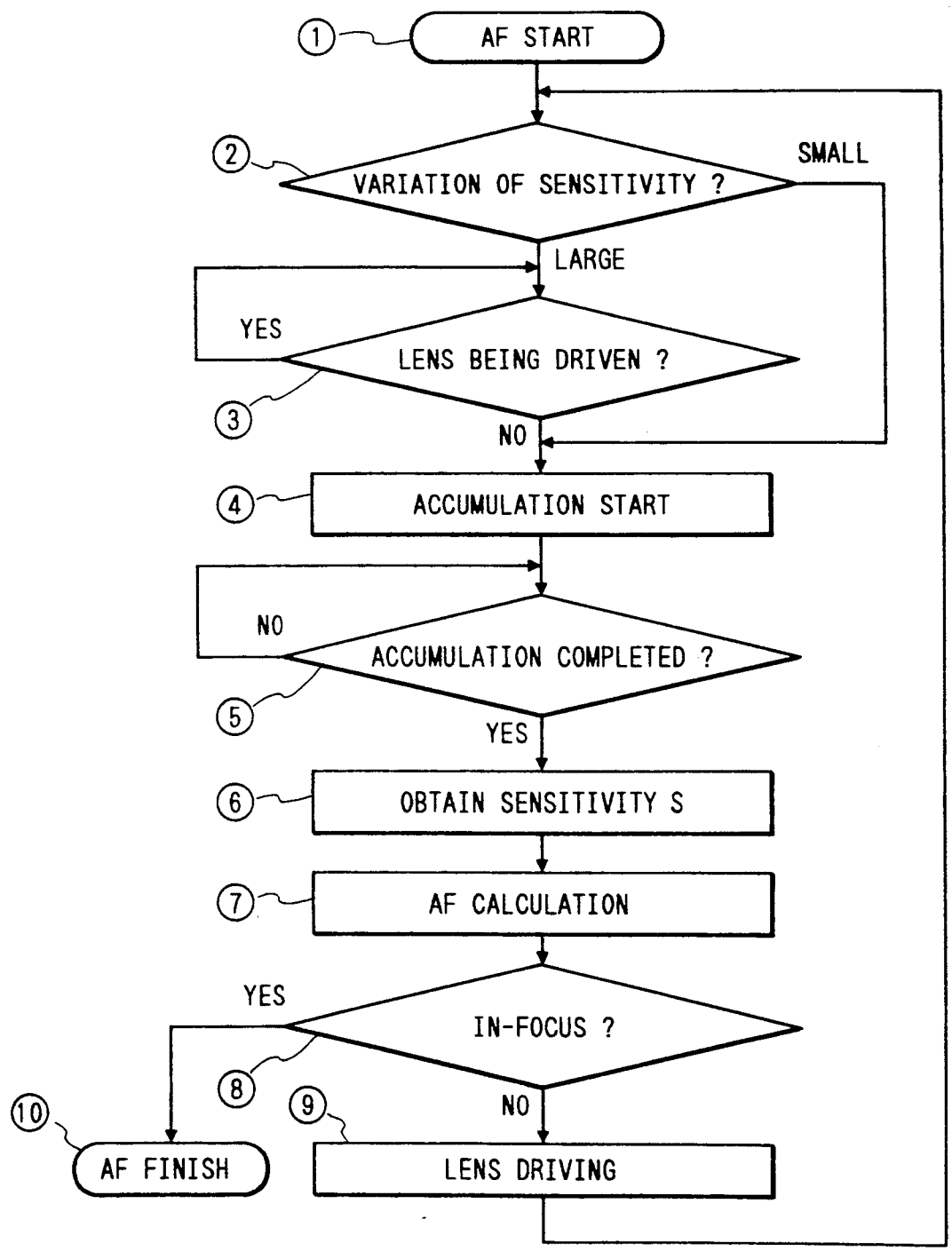

| LENS POSITION | ADDRESS | SENSITIVITY | LARGE SENSITIVITY |
|---|---|---|---|
| $d_0 \sim d_1$ | 1 | $S_{01}, S_{11}, S_{21}, S_{31}$ | |
| $d_1 \sim d_2$ | 2 | $S_{02}, S_{12}, S_{22}, S_{32}$ | |
| $d_2 \sim d_3$ | 3 | $S_{03}, S_{13}, S_{23}, S_{33}$ | A |
| ⋮ | ⋮ | ⋮ | |
| $d_{N-1} \sim d_N$ | N | $S_{0N}, S_{1N}, S_{2N}, S_{3N}$ | |

CAMERA SYSTEM WITH AUTO-FOCUSING DEVICE

BACKGROUND OF THE INVENTION

1. Field of the Invention

The present invention relates to an auto-focusing device used in photographing or video imaging, and more particularly to an auto-focusing device of a camera which uses an exchangeable lens.

2. Related Background Art

Today, a camera having an auto-focusing (AF) function is a primary one. In such an AF camera, an image is stored in an AF sensor, a correlation calculation is done based or the stored sensor output signal to calculate a defocus amount to an in-focus position, and if the defocus amount is not in the in-focus state, a lens drive amount is calculated from a relational formula of the defocus amount and the drive amount of the focusing lens, and the lens is driven into the in-focus state.

A sensitivity of the lens is a coefficient to be used in the calculation of the lens drive amount based on the defocus amount and it is determined by a focal length of the lens and a characteristic of a drive control unit. There is a following relation between the defocus amount and the sensitivity.

$$V = \frac{d}{S_0 + dS_1 + d^2S_2 + d^3S_3 + \ldots}$$

where
V : lens drive amount
d : defocus amount
$S_0$: 0-order sensitivity
$S_1$: 1-order sensitivity
$S_2$: 2-order sensitivity
$S_3$: 3-order sensitivity Where a lens system mounted on the camera is a zoom lens, the sensitivity varies with the zoom position. Accordingly, the sensitivity is read when the drive distance is to be calculated.

In a recent focusing system of the lens system, an inner focus system in which a driven lens system is small and light in weight is frequently used. In the inner focus system, because the lenses used for focusing are small and light as described above, a load to a driving actuator is small and the actuator itself may be small and rapid drive may be attained. It also has an advantage over a front lens drive system in that a minimum photographing distance is shorter. However, in the inner focus type lens system, since the sensitivity greatly changes depending on the position of the focusing lens, if the AF operation is done while the focusing lens system is driven (overlapped operation), the sensitivity read in the calculation of the lens drive distance and the sensitivity at the time of storing in the sensor differ from each other because the lens position at the time of storing in the sensor and the lens position for use in the calculation of the lens drive amount in the AF calculation are different from each other, and the calculated lens drive amount is different from an actual lens drive amount.

The above drawback is explained with reference to FIG. 3. FIG. 3 shows a graph of change of sensitivity by the position (position of a distance ring) of the focusing lens for a telescope end of a zoom lens having a focal distance of 35-135 mm. A broken line is for a front lens drive type lens, and a solid line is for an inner focus type lens. As seen from FIG. 3, the inner focus type lens shows a larger variation in the sensitivity than that of the front lens drive type (In FIG. 3, they are normalized so that the sensitivity at an infinite position is 1.0). For example, when the distance ring is driven from 2 m to 1.3 m during the accumulation in the sensor, the sensitivity changes from 0.95 to 0.93 for the front lens type (broken line) but it largely changes from 0.62 to 0.5 for the inner focus type (solid line). When the defocusing distance has been calculated and the sensitivity is read, the sensitivity would have further changed and it would be significantly different from an average sensitivity during the accumulation in the sensor.

Thus, the change is negligible in the front lens type but the change is too large in the inner focus type to correctly calculate the lens drive distance.

SUMMARY OF THE INVENTION

One aspect of the present invention is to provide an auto-focusing device which inhibits the overlapped operation (the lens is driven while the image is stored by the AF sensor and/or the defocusing distance is calculated) when the device is not suitable to proceed with the overlapped operation.

Another aspect of the present invention is to provide an auto-focusing device which selects the execution or non-execution of the overlapped operation based on the overlapped operation permission/inhibition data stored in the lens system.

Other aspect of the present invention is to provide a lens system which stores data showing a lens position versus sensitivity characteristic as the overlapped operation permission/inhibition data for each exchangeable lens.

BRIEF DESCRIPTION OF THE DRAWINGS

FIG. 2 shows a flow chart of a program flow in the camera system shown in FIG. 1.

DESCRIPTION OF THE PREFERRED EMBODIMENTS

Figure 1:
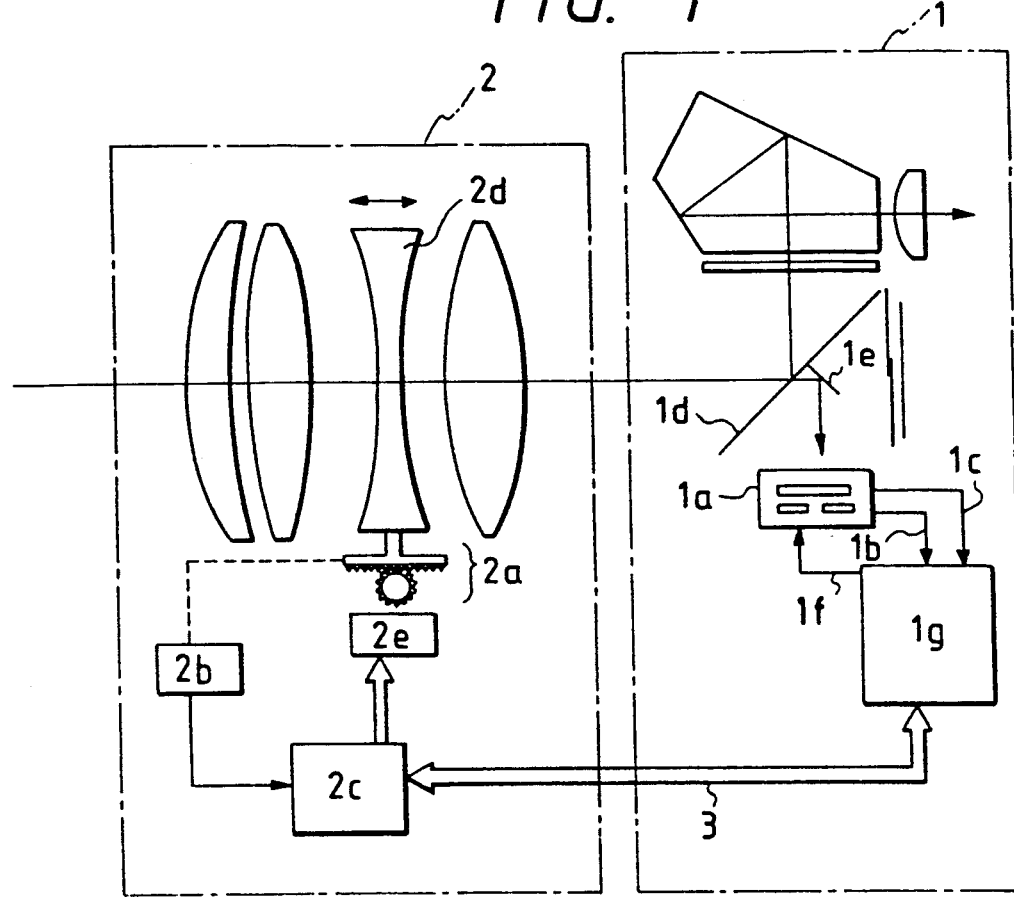
FIG. 1 shows a configuration of a lens system to which an auto-focusing system is adopted and a camera system in accordance with one embodiment of the present invention.
Figure 3:
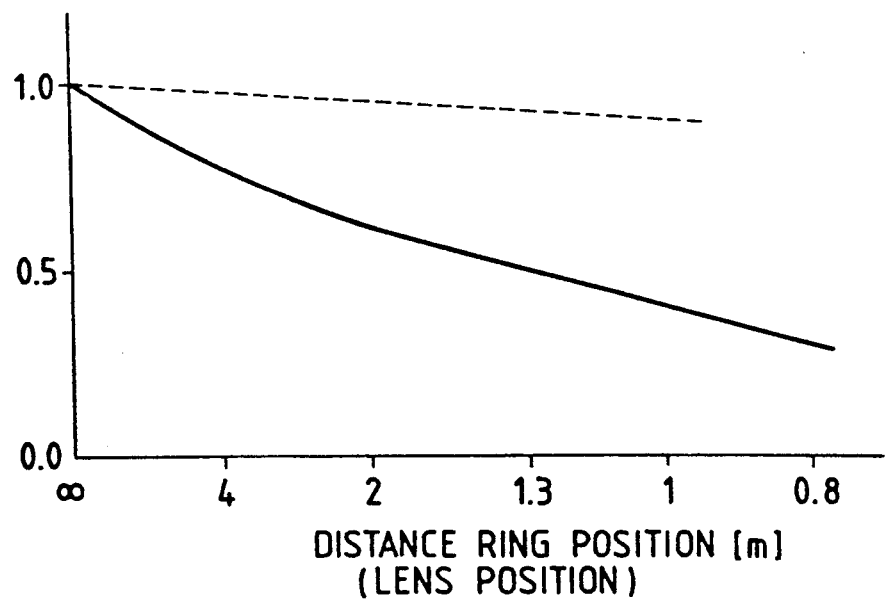
FIG. 3 shows a relation between a lens position and a sensitivity.

FIG. 1 shows a block diagram of one embodiment of a camera having an auto-focusing device in accordance with the present invention.

Numeral 2 denotes an exchangeable lens system mounted on a camera body, and numeral 2d in the lens system denotes an auto-focusing lens system. Numeral 2a denotes a connecting system having gears for driving the lens system 2d and coupled to a motor included in a motor circuit 2e, numeral 2b denotes an encoder which functions as a lens position detector for detecting a position of the lens system 2d to produce a position signal representing the lens position, and numeral 2c denotes a microcomputer in the lens which communicates with a microcomputer in the camera through a communication line 3. Sensitivities $S_0$, $S_1$, $S_2$ and $S_3$ are stored in the microcomputer 2c for the respective lens positions and sets of lens positions which are used as addresses and the sensitivities ($S_0$, $S_1$, $S_2$, $S_3$) are stored in a ROM. The address of the ROM is designated by the lens position signal from the encoder 2b and the sensitivity at the designated address is communicated to the camera through the line 3.

Data which indicates the magnitude of the sensitivity variation (overlapped operation permission/inhibition inhibition data) is stored in the ROM in the microcomputer 2c as data representing a specific characteristic of the lens. Numeral 2e denotes a motor circuit which drives the lens system 2d through the connecting system 2a in response to the lens drive signal from the microcomputer 2c.

Numeral 1 denotes a camera body which includes a main mirror 1d and a ranging sub-mirror 1e. Numeral 1a denotes a sensor device having a pair of ranging sensor arrays for sensing an object image through the mirror systems 1d and 1e and a monitor sensor for controlling an accumulation time, and numeral 1g denotes a microcomputer which receives the image signal from the arrays of the sensor devices and the monitor signal from the monitor sensor through lines 1b and 1c and sends start/end of accumulation signals to the sensor device 1a through a line 1d. The microcomputer 1g contains a program to be described later and performs lens drive amount calculation for a defocus amount and data communication with the microcomputer 2c.

Figures 4, 5:
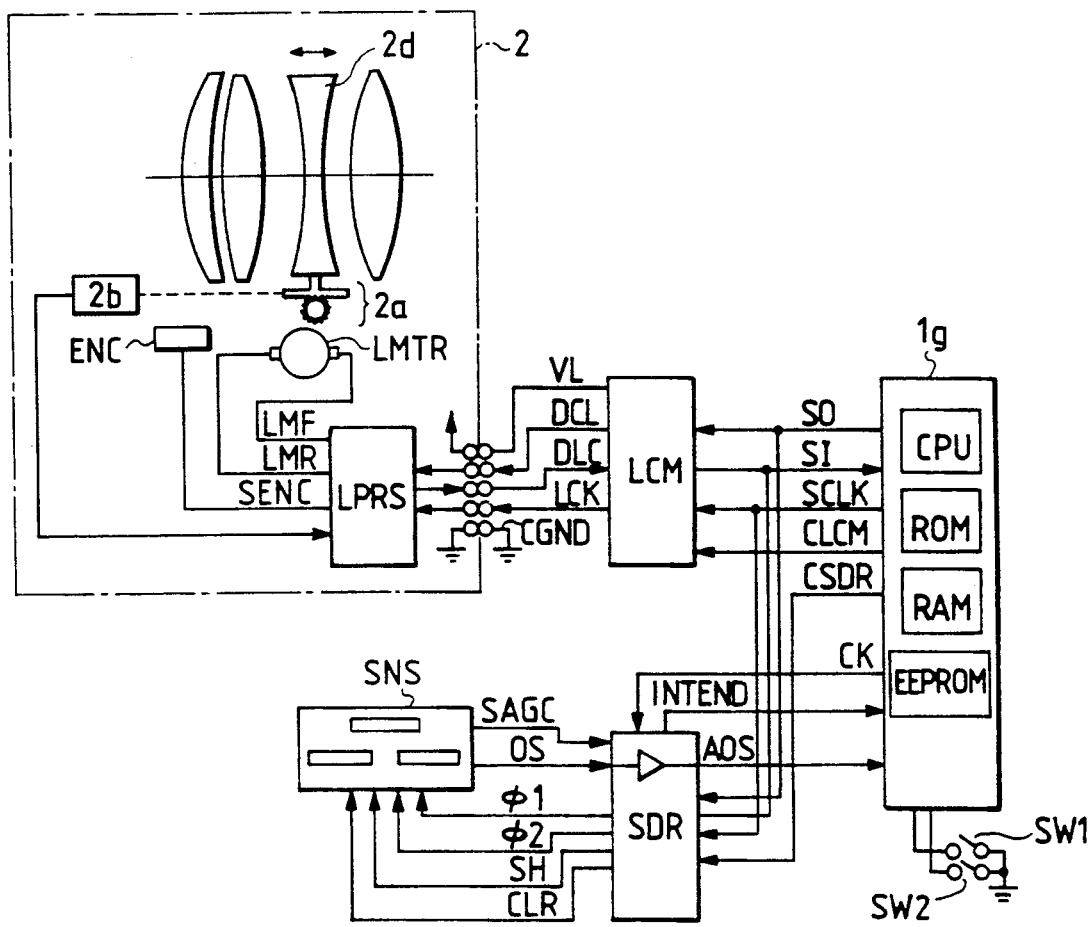
FIG. 4 shows a circuit diagram of the lens system and the camera system shown in FIG. 1.
FIG. 5 shows a relation between a lens position and a sensitivity.

FIG. 4 shows a circuit diagram of the lens device and the camera shown in FIG. 1.

Numeral 1g denotes a one-chip microcomputer which includes a CPU (central processing unit), a ROM, a RAM an EEPROM (electrically erasable programmable ROM) and an A/D conversion function. It performs camera operations such as automatic exposure control function, automatic focus detection function and film wind-up/rewind function in accordance with a camera sequence program stored in the ROM. The EEPROM is a kind of non-volatile memory and various control data are written therein during the process.

The microcomputer 1g communicates with a peripheral circuit and the lens by communication signals SO, SI, SCLK to control the circuits and the operation of the lens.

SO denotes a data signal produced by the computer 1g, SI denotes a data signal supplied to the computer 1g, and SCLK denotes a synchronization signal for the signals SO and SI.

LCM denotes a lens communication buffer circuit which supplies a lens power supply VL to the lens while the camera is in operation, and when a signal CLCM from the computer 1g is of high level (H), it functions as a communication buffer between the camera and the lens.

When the computer 1g sets CLCM to "H" and sends predetermined data from SO in synchronism with SCLK, the buffer circuit LCM outputs buffer signals LCK and DCL of SCLK and SO to the lens through the camera-lens contacts. It also outputs the buffer signal of the signal DLC from the lens as SI, and the computer 1g receives the lens data from the SI signal in synchronism with SCLK.

SDR denotes a drive circuit of a focus detection line sensor device SNS. It forms 1a of FIG. 1 together with SNS. When a signal CSDR is "H", it is selected and controlled by the computer 1g by SO, SI and SCLK.

A signal CK is a clock for generating CCD driving clocks $\phi 1$ and $\phi 2$, and a signal INTEND is one for informing the end of accumulation to the computer 1g.

An output signal OS of the device SNS is a time-serial image signal synchronized with the clocks $\phi 1$ and $\phi 2$. It is amplified by an amplifier in the SDR and supplied to the computer 1g as an AOS signal. The computer 1g receives the AOS signal at an analog input terminal, converts it to a digital signal by an internal A/D conversion function in synchronism with CK, and sequentially stores it at predetermined addresses of the RAM.

SAGC which is another output signal of the SNS device is an output of an AGC control sensor in the SNS device. It is supplied to the driver SDR for use in controlling the accumulation of the image signal in the sensors of the SNS device.

A signal DCL which is supplied to a driver LPRS in the lens which functions as the computer 2c in FIG. 1, in synchronism with the signal LCK is command data from the camera to the lens 2. The operation of the lens for the command is predetermined.

LPRS decodes the command in accordance with a predetermined procedure and controls focusing and discharging and outputs various lens parameters (open F number, focal distance, sensitivity (coefficient of defocusing distance vs. drive distance) etc.) supplied from the output DLC.

LMTR is a focusing motor circuit which functions as 2e of FIG. 1. It is driven by signals LMF and LMR to drive the optical system along the optical axis to focus the lens. The drive amount of the optical system is monitored by pulse signals SENC from an encoder circuit ENC which comprises a pulse disk which is rotated with the optical system and produces pulses in accordance with the drive distance, and the pulse signals are counted by a counter in LPRS. When the predetermined drive is completed, the signals LMF and LMR are rendered "L" to brake the motor LMTR.

The encoder 2b comprises a code pattern disk whose surface slides on contacts as the lens system 2d is driven so that it detects the position of the lens system 2d by a range ($d_0-d_1$, $d_1-d_2$, . . . ) shown in FIG. 5. FIG. 5 shows a relation between a sensitivity of a lens and a lens position range detected by the encoder 2b, which is stored in the ROM in the computer 2c. The sensitivity corresponding to the lens position range detected by the encoder 2b is selected. Where the sensitivity of the lens greatly varies with the lens position, characteristic data A which indicates that the sensitivity variation is large is stored in the ROM as the lens characteristic. For the lens whose sensitivity does not largely change with the lens position, such lens characteristic data is not stored in the ROM.

The operation of the embodiment of FIG. 1 (FIG. 4) is now explained with reference to the flow chart of FIG. 2.

By depressing a release button (not shown), a switch SW is turned on and a step 1 is started. In a step 2, communication is made with the microcomputer 2c of the lens system. The characteristic data A for the lens (overlapped operation permission/inhibition data) in the ROM of the microcomputer 2c is supplied to the microcomputer 1g. Based on this data, whether the mounted lens system has a large sensitivity variation or not is determined. If a lens system having a small sensitivity change is mounted, the data A is not read and the process proceeds to step 4. In the step 4, the start of accumulation signal for the image signal is sent to the sensor device 1a through the line 1f so that the arrays of the sensor device 1a starts the accumulation of the image signal. In step 5, the end of accumulation is monitored, and when the accumulation terminates, the process proceeds to step 6. The end of accumulation is detected by detecting the SAGC signal (FIG. 4) and sending the INTEND signal from SDR to the computer 1g (FIG.1) when the output of SAGC reaches a predetermined level. During the accumulation by the sensor device 1a, the microcomputer 1g receives the monitor signal from the monitor sensor through the line 1c, and when the accumulation of the monitor signal reaches the predetermined level, it sends the end of accumulation signal to the sensor device 1a through the line 1d to terminate the accumulation. After the termination of accumulation, the process proceeds to step 6. When the accumulation is terminated, the image signal is supplied from the sensor arrays to the microcomputer 1g.

In step 6, communication with the microcomputer 2c is made through the line 3. The microcomputer 2c produces the sensitivity value (FIG. 5) based on the address determined by the position signal from the encoder 2b in accordance with the current lens position, and supplies the sensitivity value to the microcomputer 1g. In step 7, a defocus amount d is determined based on the image signal stored in the arrays and a lens drive amount V is calculated based on the sensitivity value determined in the step 6 by the following formula.

$$V = \frac{d}{S_0 + dS_1 + d^2S_2 + d^3S_3} \quad (1)$$

where
  V : lens drive amount
  d : defocus amount
  $S_0$: 0-order sensitivity
  $S_1$: 1-order sensitivity
  $S_2$: 2-order sensitivity
  $S_3$: 3-order sensitivity In a step 8, the in-focus state is determined if an absolute value |d| of the defocus amount d determined in the step 7 is smaller than a predetermined value C. The process then proceeds to step 10 to terminate the AF operation. On the other hand, if the out-of-focus state is determined in the step 8, the process proceeds to step 9 in which the drive distance V is supplied from the microcomputer 1g to the microcomputer 2c (LPRS in FIG. 4) and the lens is driven accordingly by the motor circuit 2e. The lens is driven until the count of the counter in LPRS (FIG. 4) which counts the pulse signals SENC reaches the drive amount V supplied to LPRS. After the drive of the lens has been started in the step 9, the process returns to the step 2 while the lens is driven, and the above steps are repeated until the in-focus state is detected in the step 8.

In this manner, when the sensitivity variation of the mounted lens is small, the overlapped operation is carried out so that the image signal is accumulated while the lens is being driven.

The operation when the sensitivity variation of the mounted lens is large is now explained. In this case, the characteristic data A communicated in the step 2 is read from the ROM of the lens and a step 3 is executed. Thus, the accumulation of the next image signal is not started until the lens drive by the drive amount V is terminated after the start of the lens drive in the step 9. The end of lens drive is detected by the end of lens drive signal which is supplied from the lens to the camera when the count in the counter of the LPRS circuit reaches the lens drive amount V.

The microcomputer 2c monitors the lens drive operation of the motor circuit 2e. When the lens is driven by the drive amount V, it informs the end of the drive to the microcomputer 1g through the line 3 and the process proceeds from the step 3 to the step 4.

In this manner, when the lens system having a large sensitivity variation is mounted, the lens drive during the accumulation of the image signal is inhibited to prevent incorrect calculation of the lens drive distance.

In the above embodiment, the decision in the step 2 is made based on the data representing the magnitude of the sensitivity variation which is specific characteristic data stored in the ROM of the microcomputer 2c in the lens system. Alternatively, since the magnitude of the sensitivity variation is inherent to the individual lens, data representing the type of lens may be supplied to the camera so that whether the step 3 is to be executed or not is determined based on the type of lens.

Further, instead of informing the magnitude of the sensitivity variation of the lens to the camera by the data communication, a switch may be provided in a lens having a large sensitivity variation so that the large sensitivity variation of the lens is directly informed to the camera by the switch. In the above embodiment, the overlapped operation is permitted or inhibited in accordance with the characteristic of the exchangeable lens. Alternatively, where the sensitivity variation increases when an extender is mounted to the lens, the characteristic data A may be stored in a ROM in the extender.

I claim:

1. A camera for exchangeably mounting a first type of optical accessory device which is not suitable for an overlapped operation in which an image signal from an object is accumulated by an accumulation type sensor and a lens drive amount is calculated by an operation circuit based on the accumulated image signal for focusing a focusing lens while the focusing lens is driven, and a second type of optical accessory which is suitable for the overlapped operation, comprising:
   a) a discrimination circuit for discriminating a mounted optical accessory device;
   b) a control circuit for controlling the overlapped operation; and
   c) an inhibit circuit for inhibiting the overlapped operation by the control circuit when said discrimination circuit determines that the mounted optical accessory device is the first type of accessory device.

2. A camera according to claim 1 wherein said accessory device includes information indicating permission or inhibition of the overlapped operation, and said discrimination circuit discriminates based on said information.

3. A camera according to claim 2 wherein the information relates to characteristic information of the lens to be used for calculating the lens drive amount by said operation circuit.

4. A camera according to claim 3 wherein the information relates to the magnitude of variation of the characteristic information relative to the change of lens position.

5. A camera according to claim 4 wherein said discrimination circuit activates said inhibit circuit when said discrimination circuit determines that the variation is large based on the information.

6. A camera according to claim 1, wherein said operation circuit calculates the lens drive amount based on the image signal and specific data inherent to the accessory device, and the accessory device contains the specific data.

7. A camera according to claim 1, wherein said optical accessory device comprises an interchangeable lens detachably mounted on the camera.

8. A camera system including a camera and an accessory device for exchangeably mounting a first type of optical accessory device which is not suitable for an overlapped operation in which an image signal from an object is accumulated by an accumulation type sensor and a lens drive amount is calculated by an operation circuit based on the accumulated image signal for focusing a focusing lens while the focusing lens is driven, and a second type of optical accessory which is suitable for the overlapped operation, comprising:
  a) a discrimination circuit for discriminating a mounted optical accessory device;
  b) a control circuit for controlling the overlapped operation; and
  c) an inhibit circuit for inhibiting the overlapped operation by the control circuit when said discrimination circuit determines that the mounted optical accessory device comprises a first type of accessory device.

9. A camera system including a camera and an accessory device according to claim 8, wherein said operation circuit calculates the lens drive amount based on the image signal and specific data inherent to the accessory device, and the accessory device contains the specific data.

10. A camera system including a camera and an accessory device according to claim 8, wherein said accessory device includes information indicating permission or inhibition of the overlapped operation, and said discrimination circuit discriminates based on said information.

11. A camera system including a camera and an accessory device according to claim 10, wherein the information relates to characteristic information of the lens to be used for calculating the lens drive amount by said operation circuit.

12. A camera system including a camera and an accessory device according to claim 11, wherein when the information relates to the magnitude of variation of the characteristic information relative to the change of lens position.

13. A camera system including a camera and an accessory device according to claim 12, wherein said discrimination circuit activates said inhibit circuit when said discrimination circuit determines that the variation is large based on the information.

14. A camera system according to claim 8, wherein said optical accessory device comprises an interchangeable lens detachably mounted on the camera.

15. An optical accessory device to be exchangeably mounted on a camera having an overlapped operation control circuit for accumulating an image signal of an object by an accumulation type sensor and calculating a lens drive amount by an operation circuit based on the accumulated image signal for focusing a focusing lens while the focusing lens is driven, an inhibit circuit for inhibiting said overlapped operation control circuit, and a discrimination circuit for determining the activation or deactivation of said inhibit circuit based on information from the mounted optical accessory device, comprising:
  a) an information source having information indicating the permission or inhibition of the overlapped operation stored thereon, and
  b) a memory circuit for storing characteristic data inherent to the accessory device for calculating the lens drive amount by said operation circuit.

16. An optical accessory device according to claim 15, wherein said optical accessory device comprises an interchangeable lens detachably mounted on the camera.

* * * * *

UNITED STATES PATENT AND TRADEMARK OFFICE
CERTIFICATE OF CORRECTION

PATENT NO. : 5,130,732
DATED : July 14, 1992
INVENTOR(S) : FURUTSU

Page 1 of 2

It is certified that error appears in the above-identified patent and that said Letters Patent is hereby corrected as shown below:

COLUMN 1

Line 15, "or" should read --on--.

COLUMN 2

Line 47, "FIG. 1," should read --FIG. 1;--.

COLUMN 3

Line 9, "inhibition" should be deleted.
Line 26, "line 1d." should read --line 1f.--.
Line 34, "a RAM" should read --a RAM,--.

UNITED STATES PATENT AND TRADEMARK OFFICE
CERTIFICATE OF CORRECTION

PATENT NO. : 5,130,732

DATED : July 14, 1992

INVENTOR(S) : Furutsu

It is certified that error appears in the above-indentified patent and that said Letters Patent is hereby corrected as shown below:

```
Column 6, line 52, "claim 1" should read -- claim 1, --.
          line 57, "claim 2" should read -- claim 2, --.
          line 61, "claim 3" should read -- claim 3, --.
          line 65, "claim 4" should read -- claim 4, --.
Column 8, Line 7, "when" should be deleted.
```

Signed and Sealed this

Fourteenth Day of September, 1993

*Attest:*

*Attesting Officer*

BRUCE LEHMAN

*Commissioner of Patents and Trademarks*